May 17, 1966  P. E. CALDWELL  3,251,065
WELDING HELMET
Filed Feb. 24, 1964  2 Sheets-Sheet 1
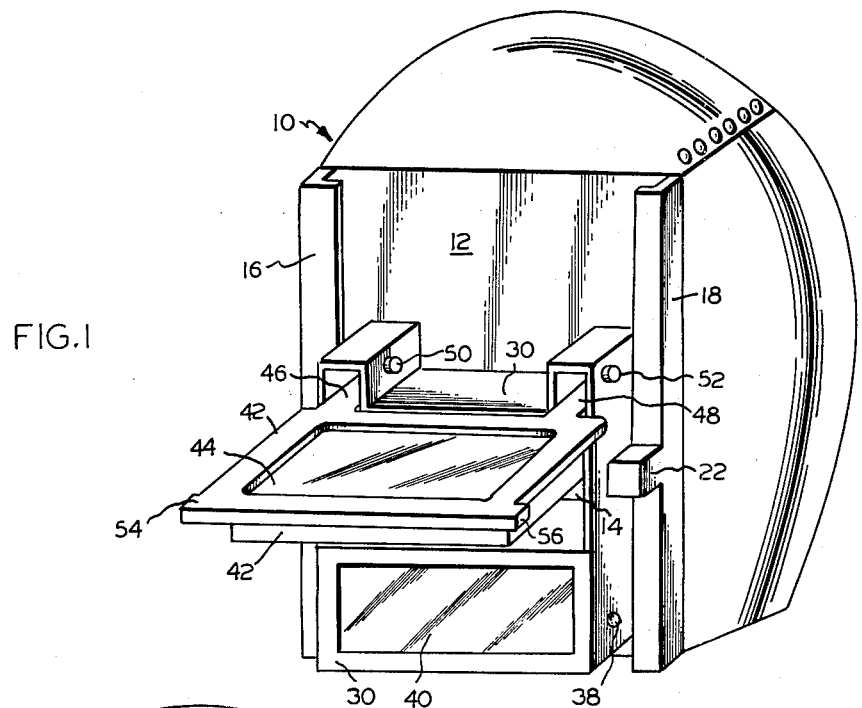
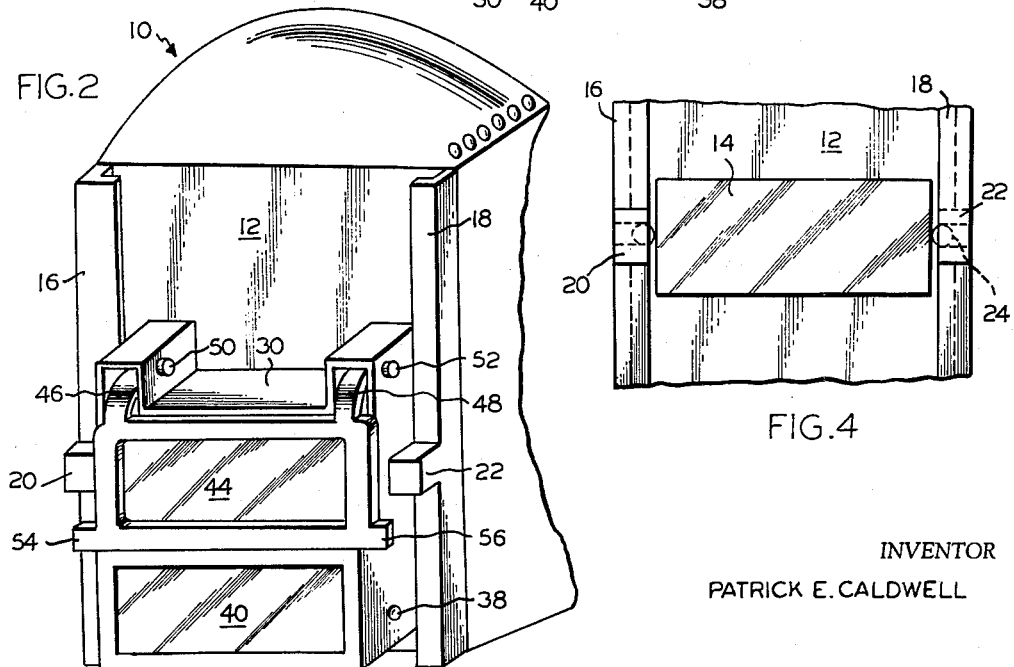
INVENTOR
PATRICK E. CALDWELL
BY *Birch & O'Brien*
ATTORNEYS May 17, 1966  P. E. CALDWELL  3,251,065
WELDING HELMET
Filed Feb. 24, 1964  2 Sheets-Sheet 2
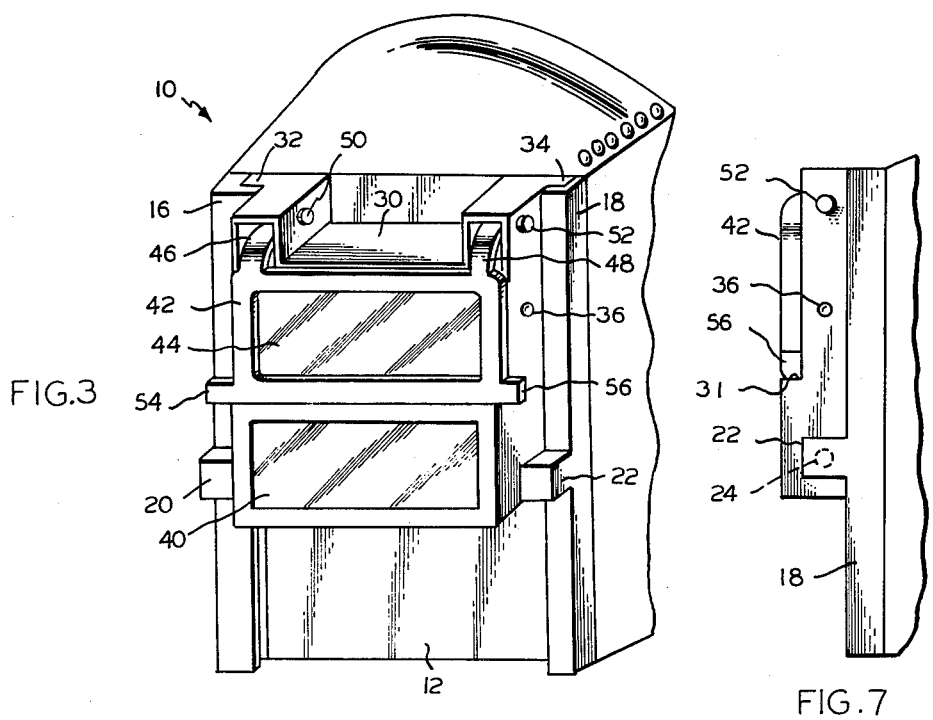
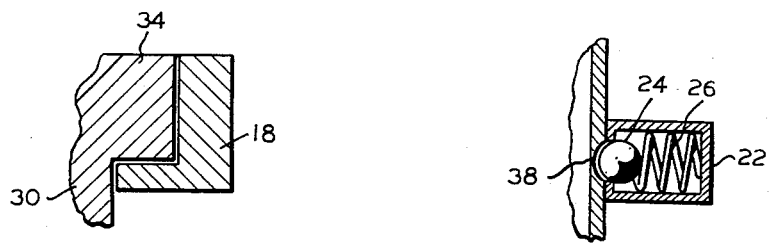
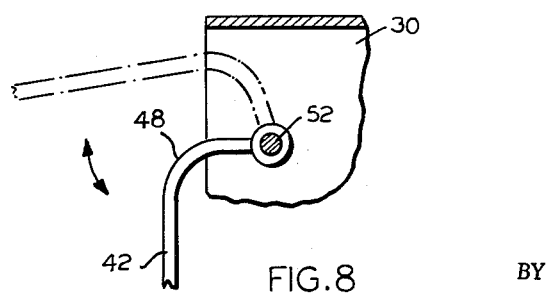
INVENTOR
PATRICK E. CALDWELL
BY  *Birch & O'Brien*
ATTORNEYS United States Patent Office 3,251,065
Patented May 17, 1966

3,251,065
WELDING HELMET
Patrick E. Caldwell, Albuquerque, N. Mex.
Filed Feb. 24, 1964, Ser. No. 346,797
7 Claims. (Cl. 2—8)

This invention relates to welding helmets or masks and in particular to interchangeable window lenses therefor to prevent injury to the facial area of the user as by harmful light rays, sparks, flying particles, etc.

Conventional welding helmets now in general use include the concept of a pair of lenses movably mounted on the helmet for alternate use by the wearer. However, the modern welding shop is so equipped as to perform more than two types of welding operation as well as other types of metal working operations. For instance, in addition to welding, it may also be necessary for the welder to perform a cutting and/or grinding operation on a particular type of work. Thus, it has been necessary for the welder to remove his welding helmet and don a pair of goggles to protect his eyes from flying particles, etc. The goggles were necessary because of the need for clear lenses to see the work which would not be possible with filter lenses needed during welding operations.

It is, therefore, an object of the present invention to eliminate the need for goggles by a welder performing a plurality of metal working operations.

It is another object of this invention to permit a welder to perform a grinding or slag chipping operation without removal of his welder's helmet.

This invention has another object in that three differnet lenses are mounted on a face mask or the like for alternate use by a metal worker.

The present invention has a further object in that a welder's helmet is simply constructed so as to be convenient and accommodating to the welder for a grind operation as well as for two types of welding operations.

It is a further object of this invention to slidably mount two lenses on a welder's helmet with one of such lenses also being pivotally mounted.

In practicing the present invention, a preferred embodiment of welder's helmet includes a hood having a generally rectanguar front piece with a clear lens therein and having slide track means thereon; a lens assembly including a pair of lenses is slidably mounted on the track means for movement between two operative positions and one of such pair of lenses is independently movable whereby both of the pair of lenses are each disposed in an operative position and the clear lens is only one in an operative position.

Other objects and advantages of the present invention will become apparent from the following description of a preferred embodiment taken in connection with the accompanying drawings wherein:

FIGURE 1 is a perspective view of a welding helmet embodying the features of the present invention and showing one operative position thereof;

FIGUE 2 is a perspective view similar to FIGURE 1 but showing a second operative position thereof;

FIGURE 3 is a perspective view similar to FIGURE 1 but showing a third operative position thereof;

FIGURE 4 is a partial front elevation view of FIGURE 1 with parts removed;

FIGURE 5 is a partial cross section of a detail of FIGURE 3;

FIGURE 6 is a partial cross section of another detail of FIGURE 3;

FIGURE 7 is a side elevation view of FIGURE 3 with the fiber portion removed; and FIGURE 8 is a partial cross section of another detail of FIGURE 3.

As is shown in FIGURE 1 of the drawings, the present invention is embodied in a helmet or hood element, indicated generally at 10, which includes a generally arcuate facepiece made of any suitable material such as sheet metal or substantially rigid fiber. The hood 10 includes a usual head band (not shown) for attachment to the head of a user as is conventional practice in welding helmets. The front of the welding helmet 10 includes a generally rectangular, flat front piece 12 having a rectangular opening intermediately disposed between the top and bottom of front piece 12, which defines a fixed mounting for a clear lens 14.

A pair of tracks 16 and 18, made of any suitable material such as aluminum or fiberglass are secured to the front piece 12 with one (16) on one side and the other (18) on the opposite side. Each of the tracks 16 and 18 have an L-shaped cross section (FIGURE 5) and are vertically arranged in opposed relation to each other to define a slide channel therebetween. Intermediate its ends, the front wall of each track 17 and 18 has a hollow rectangular projection 20 and 22, only one of which will be described in detail since they are of identical structure. As is shown in FIGURE 7, the projection 22 houses a detent ball 24 which is biased toward a circular opening in an inner side wall of projection 22. The ball 24 is biased by a coil spring 26 mounted in compression between te ball 24 and an opposite side wall of projection 22 whereby the ball 24 normally protrudes through inner side wall thereof. The projection 22, ball 24 and coil spring 26 define a spring loaded ball catch, however, it should be noted that various other types of catches may be utilized as will be apparent to those skilled in the art. As is illustrated in FIGURE 4, the catch projections 20 and 22 are disposed along the major axis defined by the rectangular opening 14 so as to align a lens assembly in operative position relative to the opening 14.

The lens assembly according to the present invention includes a frame member 30 having a generally rectangular configuration with side flanges 32 and 34 slidably disposed in the channel tracks 16 and 18, respectively. As viewed in FIGURES 2 and 3, the right side of the frame 30 has an upper detent 36 and a lower detent 38 for alternate cooperation with the ball 24 of the catch 22; the left side of the frame 30 also has identically located upper and lower detents (not shown) for cooperation with the catch 20.

The lower portion of the frame 30 is provided with a fixed lens 40 made of any suitable material useable during an oxyacetylene welding operation. The upper portion of the frame 30 is recessed along its front edges at 31 to provide a mounting for a pivotable lens mount 42 and its lens 44 which is made of any suitable material useable during an arc welding operation. Because of the recesses 31 the lens 44 and its mount 42 are disposed in flush relationship with the lower fixed lens 40 whereby when in the operative positions shown in FIGURES 2 and 3 the helmet does not have any elements projecting in front of the lenses; thus, obstructions that may interfere with the welder's view are eliminated.

The top of the lens mount 42 has a pair of projecting hinge arms 46 and 48 which are of arcuate configuration with their free end portions mounted on hinge pins 50 and 52, respectively. The hinge pins 50 and 52 are carried in hollow portions at the top of the frame member 30. The hinge arms and hinge pins are frictional pivot types to define a frictional pivot mount for the lens mount 42 which may be raised to and frictionally retained in an inoperative position, i.e., perpendicularly as shown in FIGURE 1. To facilitate pivotal movement of the lens mount 42, its bottom edge is provided with outwardly extending finger lugs 54 and 56 that project toward the side tracks 16 and 18, respectively, for engagement by either the left or right hand of the welder.

During a metal working operation by the welder, the helmet 10 is on the welder's head with the lenses in position for a particular operation. For example, assuming the welder is chipping slag from a welded joint, the lens frame member 30 is retained in its lower position (FIGURE 1) by the friction catches 20 and 22 engaging the upper detents 36. In this position, the upper lens 44 has been pivoted upwardly so that the two lenses 40 and 44 are disposed in inoperative positions while the clear lens 14 is operative to protect the welder from flying particles.

During an arc welding operation, the lens mount 44 is lowered to its operative position (FIGURE 2) so that the welder may look through both the clear lens 14 and the arc lens 44. To perform an oxyactylene welding operation, the lens frame 30 is manually slidable from the position of FIGURE 2 to the position of FIGURE 3 where it is retained by the frame detents 38 cooperating with the friction catches 20 and 22.

It is now apparent that the simple arrangement described above facilities the various metal working operations that may be performed by a welder with the use of a single helmet. The combined sliding and pivoting movements of the lenses permits the welder to grind, chip slag, arc weld or oxyacetylene weld without removing his helmet and without need for special goggles.

Inasmuch as the present invention is subject to many variations, modifications, reversal of parts and changes in structural details, it is intended that all matter contained in the foregoing description of the preferred embodiment and shown on the accompanying drawings shall be interpreted as illustrative and not in a limiting sense.

What is claimed is:

1. In a protective head covering for welders and the like, the combination comprising a hood having a front piece, a safety lens fixed in said front piece, slide track means on said front piece, a lens assembly including a pair of lenses slidably mounted on said track means between two operative positions, and means for moving one of said pair of lenses independently of the other whereby said pair of lenses are each disposed in an inoperative position and said safety lens is solely operative, said means for moving one of said pair of lenses comprises a pivotal connection for pivoting the same to an inoperative position.

2. In a protection head covering for welders and the like, the combination comprising a hood element having a substantially flat front piece of generally rectangular configuration, a safety lens fixedly mounted in said front piece intermediate upper and lower ends thereof, slide track means mounted on opposite sides of said front piece, a lens assembly frame slidably disposed in said track means for sliding movement between two positions, a first lens carried by said frame for alignment with said safety lens when said frame is in a first one of its positions, a second lens carried by said frame for alignment with said safety lens when said frame is in a second one of its positions, and means for moving said second lens independently of said first lens and out of alignment with said safety lens, said moving means comprises pivot means whereby said second lens is pivoted relative to said safety lens and to said first lens.

3. The combination a recited in claim 2 wherein said second lens is fixed to a lens mounting and said pivot means comprises hinge arms extending from said lens mounting and hinge pins carried by said lens assembly frame and being frictionally engaged by said hinge arms.

4. The combination as recited in claim 3 wherein said lens mounting including finger engaging tabs on each side thereof to facilitate pivotal movement of said lens mounting and sliding movement of said lens assembly frame.

5. The combination as recited in claim 4 wherein retaining means establishes operative connections between said slide track means and said lens assembly frame for retaining the same in each of its two positions.

6. In a protective head covering for welders and the like, the combination comprising a hood having a generally rectangular front piece, a safety lens fixed in said front piece, and L-shaped track on each side of said front piece to define sliding track means therebetween, a lens assembly frame having projections on each side thereof disposed in the adjacent L-shaped track whereby said frame is vertically slidable relative to said safety lens, a pair of detent means on each side of said frame vertically spaced from each other, friction catch means on each L-shaped track cooperating with said pair of detent means to define upper and lower operative positions for said frame, a lower lens fixed to said frame and alignable with said safety lens when said frame is in its upper operative position to define an oxyacetylene welding position, a lens mounting having a lens therein defining an upper lens on said frame alignable with said safety lens when said frame is in its lower operative position to define an arc welding position, pivot means for said upper lens mounting whereby said upper lens mounting is moved out of alignment with said safety lens to define a metal working position utilizing said safety lens, and finger engaging means on said upper lens mounting to facilitate manual pivoting thereof.

7. The combination as recited in claim 6 wherein said pivot means comprises hinge pins mounted on said lens assembly frame whereby said upper lens mounting may be simultaneously with a sliding movement and with a pivotal movement.

References Cited by the Examiner

UNITED STATES PATENTS

| 2,031,676 | 2/1936 | Shindel | 2—14.21 |
| 2,277,090 | 3/1942 | Feiler | 2—8 |
| 2,719,972 | 10/1955 | Kelly | 2—8 |

FOREIGN PATENTS 449,328  6/1936  Great Britain.

JORDAN FRANKLIN, *Primary Examiner.*